(12) United States Patent
Kwon et al.

(10) Patent No.: US 11,390,220 B2
(45) Date of Patent: Jul. 19, 2022

(54) CONSOLE TRAY FOR VEHICLE HAVING INCREASED CAPACITY

(71) Applicants: HYUNDAI MOTOR COMPANY, Seoul (KR); KIA MOTORS CORPORATION, Seoul (KR); NIFCO KOREA INC., Anyang-si (KR)

(72) Inventors: Hyuk-Jae Kwon, Anyang-si (KR); Ik-Jin Jung, Hwaseong-si (KR); Sang-Ki Lee, Ansan-si (KR); Kwan-Woo Lee, Suwon-si (KR); Yong-Dae Kim, Asan-si (KR)

(73) Assignees: HYUNDAI MOTOR COMPANY, Seoul (KR); KIA MOTORS CORPORATION, Seoul (KR); NIFCO KOREA INC., Asan-si (KR)

( * ) Notice: Subject to any disclaimer, the term of this patent is extended or adjusted under 35 U.S.C. 154(b) by 39 days.

(21) Appl. No.: 17/092,933

(22) Filed: Nov. 9, 2020

(65) Prior Publication Data
US 2021/0394682 A1 Dec. 23, 2021

(30) Foreign Application Priority Data
Jun. 17, 2020 (KR) .......................... 10-2020-0073658

(51) Int. Cl.
*B60R 7/06* (2006.01)

(52) U.S. Cl.
CPC ..................... *B60R 7/06* (2013.01)

(58) Field of Classification Search
CPC ........................................................ B60R 7/06
USPC .................................................... 296/24.34
See application file for complete search history.

(56) References Cited

U.S. PATENT DOCUMENTS

| 6,601,897 | B2 * | 8/2003 | Stelandre | B60R 7/06 |
| | | | | 296/37.8 |
| 6,974,177 | B2 * | 12/2005 | Castillo | E05D 3/127 |
| | | | | 49/248 |
| 8,172,297 | B2 * | 5/2012 | Rhee | B60R 7/06 |
| | | | | 296/70 |
| 10,668,862 | B2 * | 6/2020 | Asselin | B60R 7/04 |
| 2004/0051333 | A1 * | 3/2004 | Brown | E05B 83/30 |
| | | | | 296/37.12 |
| 2020/0130594 | A1 * | 4/2020 | Park | B60R 7/06 |

FOREIGN PATENT DOCUMENTS

KR 20090119665 A * 11/2009

* cited by examiner

*Primary Examiner* — Pinel E Romain
(74) *Attorney, Agent, or Firm* — McDonnell Boehnen Hulbert & Berghoff LLP

(57) ABSTRACT

The present disclosure relates to a console tray for a vehicle capable of increasing a capacity of the tray itself by reducing a rotation radius of a cover of the console tray.

13 Claims, 20 Drawing Sheets

COVER IN CLOSED STATE

COVER IN OPENED STATE

CONSOLE TRAY FOR VEHICLE HAVING INCREASED CAPACITY

CROSS REFERENCE TO RELATED APPLICATIONS

This application claims priority under 35 U.S.C. § 119 to Korean Patent Application No. 10-2020-0073658, filed on Jun. 17, 2020, in the Korean Intellectual Property Office, the disclosure of which is incorporated herein by reference in its entirety.

BACKGROUND

1. Field of the Disclosure

The present disclosure relates to a console tray for a vehicle, and more particularly, to a console tray for a vehicle, which has an increased a capacity of the tray itself by reducing a rotation radius of a cover of the console tray.

2. Description of the Related Art

In general, a console tray for storing articles is installed on a console of a vehicle.

FIGS. 1A to 1C are configuration views of a console tray for a vehicle in the related art, in which FIG. 1A is a perspective view of the console tray, and FIGS. 1B and 1C are views illustrating states in which the console tray operates.

As illustrated in FIG. 1A, a console tray 10 in the related art includes a cover unit 30 configured to open or close an inlet of the tray, and a housing 20 configured to support the cover unit 30 and define an external shape of a console.

In the console tray 10 in the related art, the cover unit 30 is coupled to the housing 20 by means of a hinge 40, and the cover unit 30 opens or closes the tray by rotating in an up-down direction about the hinge 40.

That is, as illustrated in FIG. 1C, when the cover unit 30 is opened from a state in which the cover unit 30 of the tray is closed as illustrated in FIG. 1B, the cover unit 30 is raised upward about the hinge 40, such that the tray is opened.

In the console tray 10 in the related art, the cover unit 30 is rotated with a rotation radius of approximately 88 degrees, and a space is required to permit the rotation radius. Therefore, there is a problem in that a capacity of the housing 20 of the console tray 10 is reduced, and there is concern that utilization of the tray 10 having a small capacity deteriorates.

SUMMARY

The present disclosure has been made in an effort to provide a novel console tray capable of increasing a capacity of the tray itself by reducing a rotation radius of a cover.

An exemplary embodiment of the present disclosure provides a console tray including a housing configured to define an internal space of the tray, having a housing gear train attached to a side plate, and having a driving gear configured to mesh with the housing gear train, a cover unit including a cover plate coupled to be rotatable upward from the housing and configured to open or close an inlet of the tray, and an arm formed on a rear surface of the cover plate and configured to be rotated as the cover plate is moved in an up-down direction, and a guide member having a hinge shaft inserted into a passing hole of the arm, having a gear shaft axially coupled to the driving gear, and configured to guide the arm configured to be rotated as the cover plate is moved in the up-down direction.

According to the console tray according to the present disclosure configured as described above, the capacity of the tray itself is increased by reducing the rotation radius of the cover unit, thereby improving utilization of the tray installed on the console.

BRIEF DESCRIPTION OF THE FIGURES

FIGS. 1A to 1C are configuration views of a console tray for a vehicle in the related art, in which FIG. 1A is a perspective view of the console tray, and FIGS. 1B and 1C are views illustrating states in which the console tray operates.

FIGS. 6A and 6B are detailed views illustrating components of the console tray for a vehicle according to the exemplary embodiment of the present disclosure, in which FIG. 6A is a perspective view of a hinge guide, and FIG. 6B is a perspective view of a slider.

FIGS. 7A to 7C are views illustrating states in which the console tray for a vehicle according to the exemplary embodiment of the present disclosure operates, in which FIG. 7A is a view illustrating a state before the console tray operates, FIG. 7B is a view illustrating a state while the console tray operates, and FIG. 7C is a view illustrating a state after the console tray operates.

FIGS. 11A to 11C are detailed views illustrating components of the console tray for a vehicle according to another exemplary embodiment of the present disclosure, in which FIG. 11A is a perspective view illustrating a hinge guide, FIG. 11B is a perspective view illustrating a damper gear, and FIG. 11C is a perspective view illustrating a rim and an O-ring positioned on a bottom surface of an arm base.

FIGS. 12A to 12C are views illustrating states in which the console tray for a vehicle according to another exemplary embodiment of the present disclosure operates, in which FIG. 12A is a view illustrating a state before the console tray operates, FIG. 12B is a view illustrating a state while the console tray operates, and FIG. 12C is a view illustrating a state after the console tray operates.

DETAILED DESCRIPTION

Hereinafter, a configuration and an operation of a console tray for a vehicle for increasing a capacity according to the present disclosure will be described in detail with reference to the drawings.

However, the disclosed drawings are provided as an example for fully transferring the spirit of the present disclosure to those skilled in the art. Therefore, the present disclosure is not limited to the drawings disclosed below and may be specified as other aspects.

Unless otherwise defined, the terminologies used in the specification of the present disclosure have the meanings that a person with ordinary skill in the technical field to which the present disclosure pertains typically understands, and in the following description and the accompanying drawings, a detailed description of publicly known functions and configurations will be omitted so as to avoid unnecessarily obscuring the subject matter of the present disclosure.

Figure 1A:
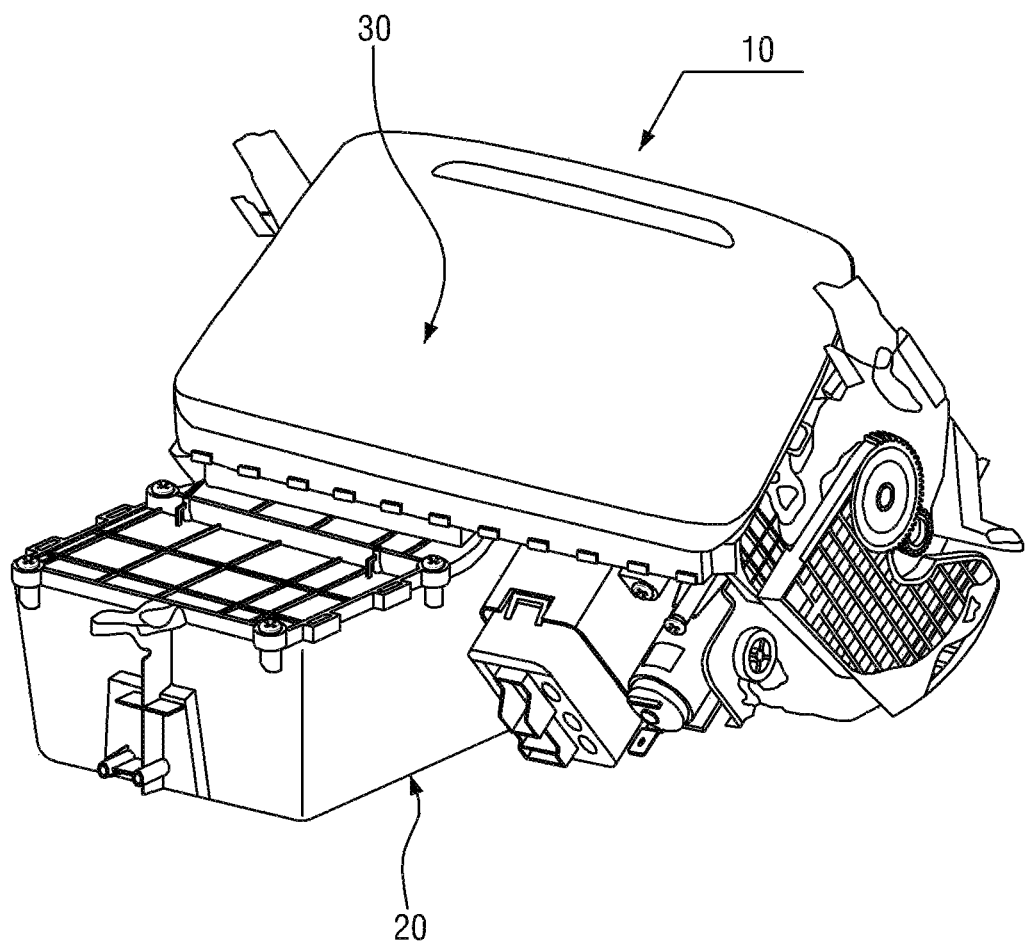
Figure 1B:
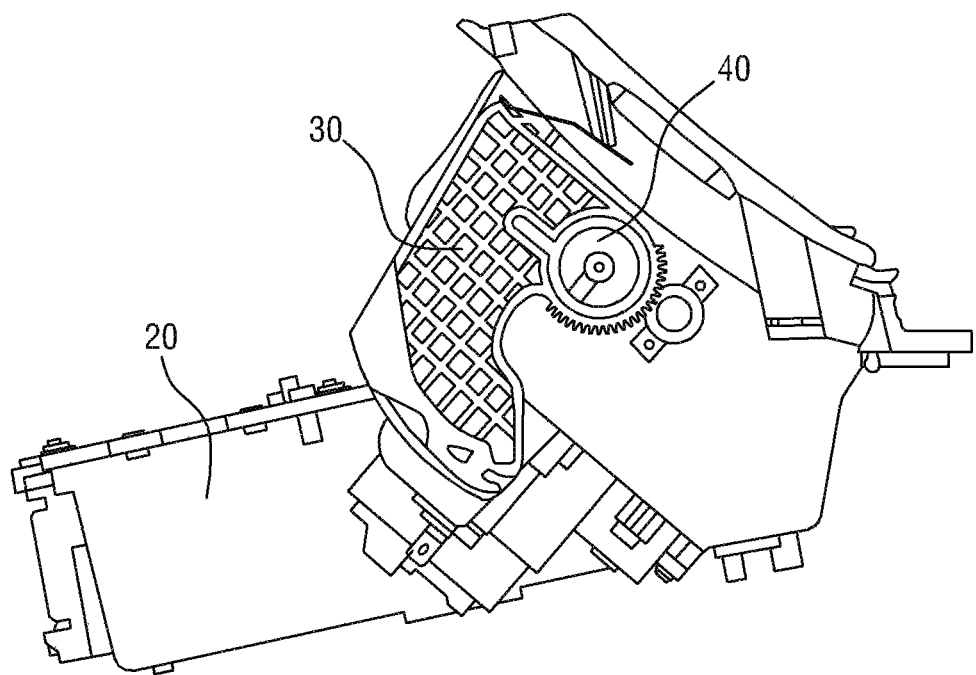
Figure 1C:
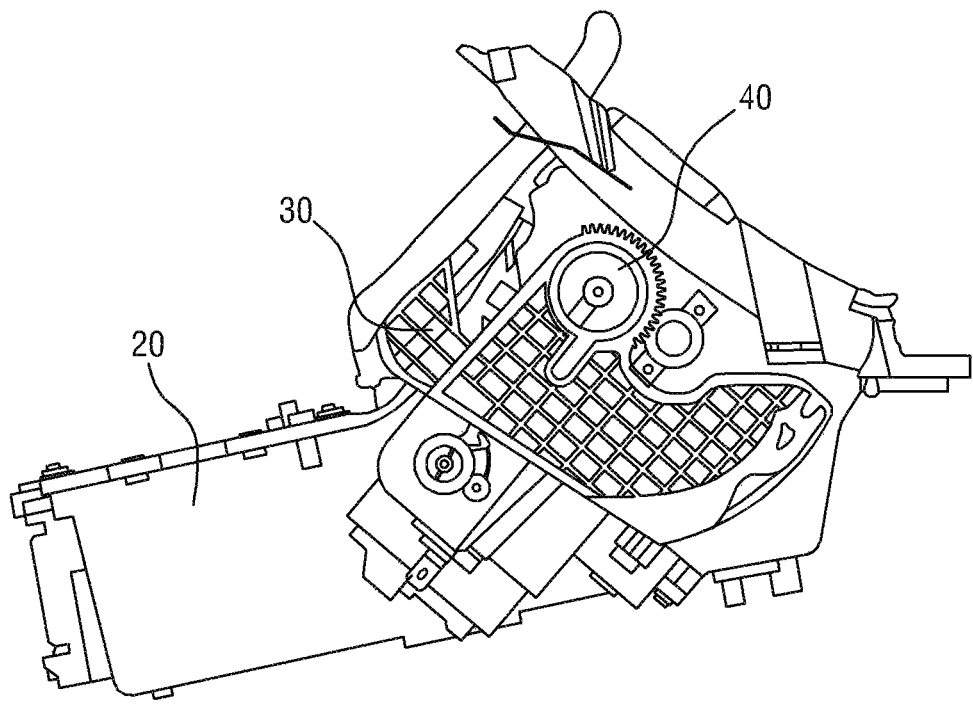
Figure 2:
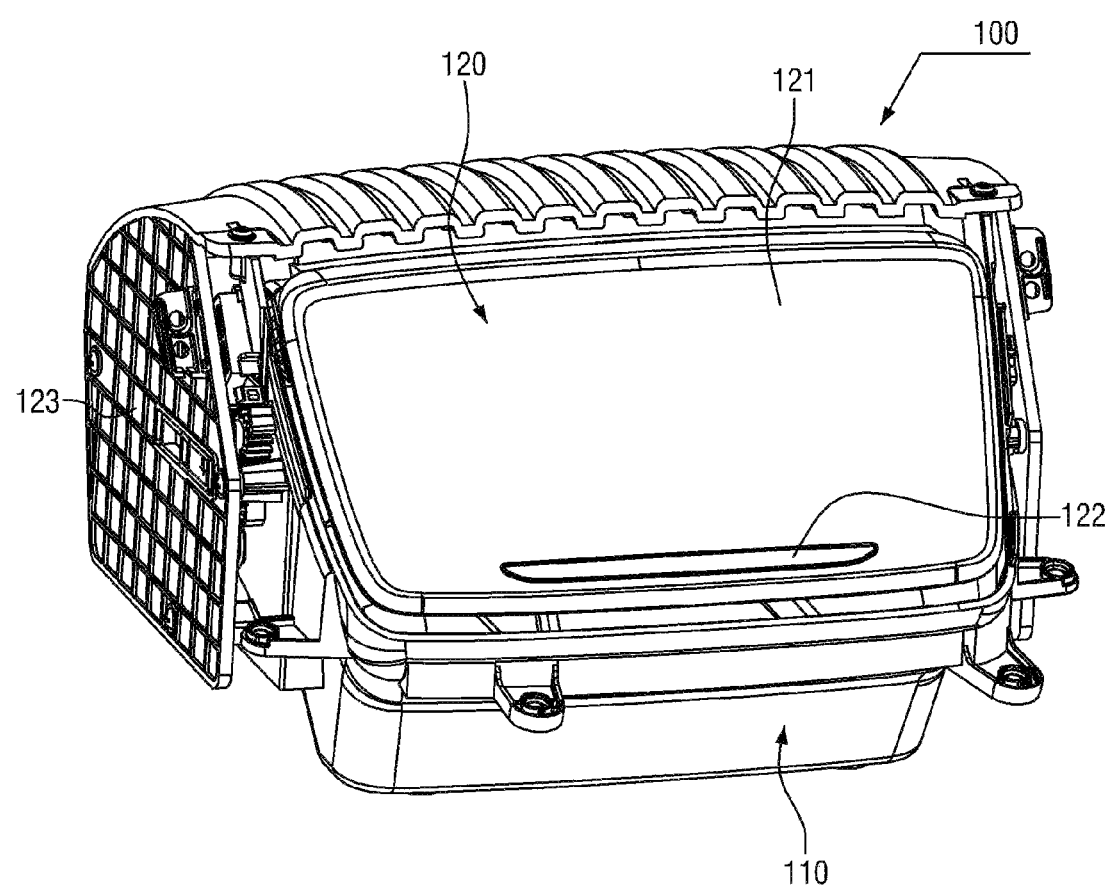
FIG. 2 is a perspective view illustrating a console tray for a vehicle according to an exemplary embodiment of the present disclosure.
Figure 3:
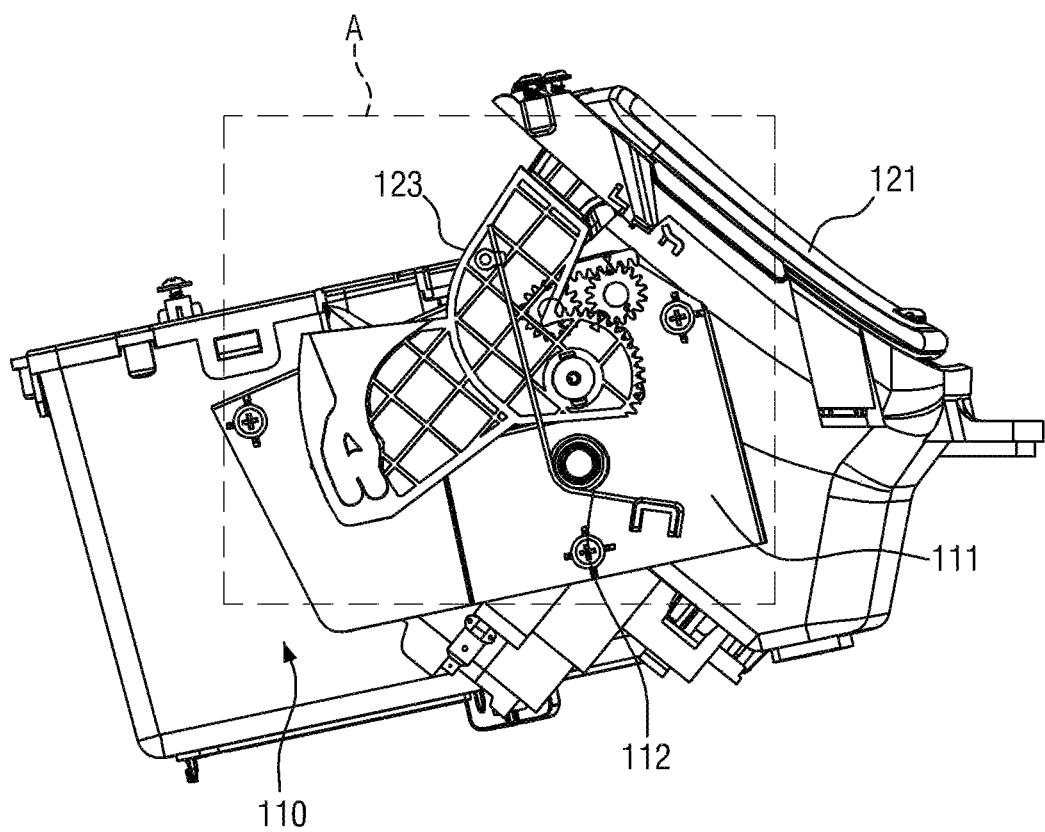
FIG. 3 is a cross-sectional view illustrating the console tray for a vehicle according to the exemplary embodiment of the present disclosure.
Figure 4:
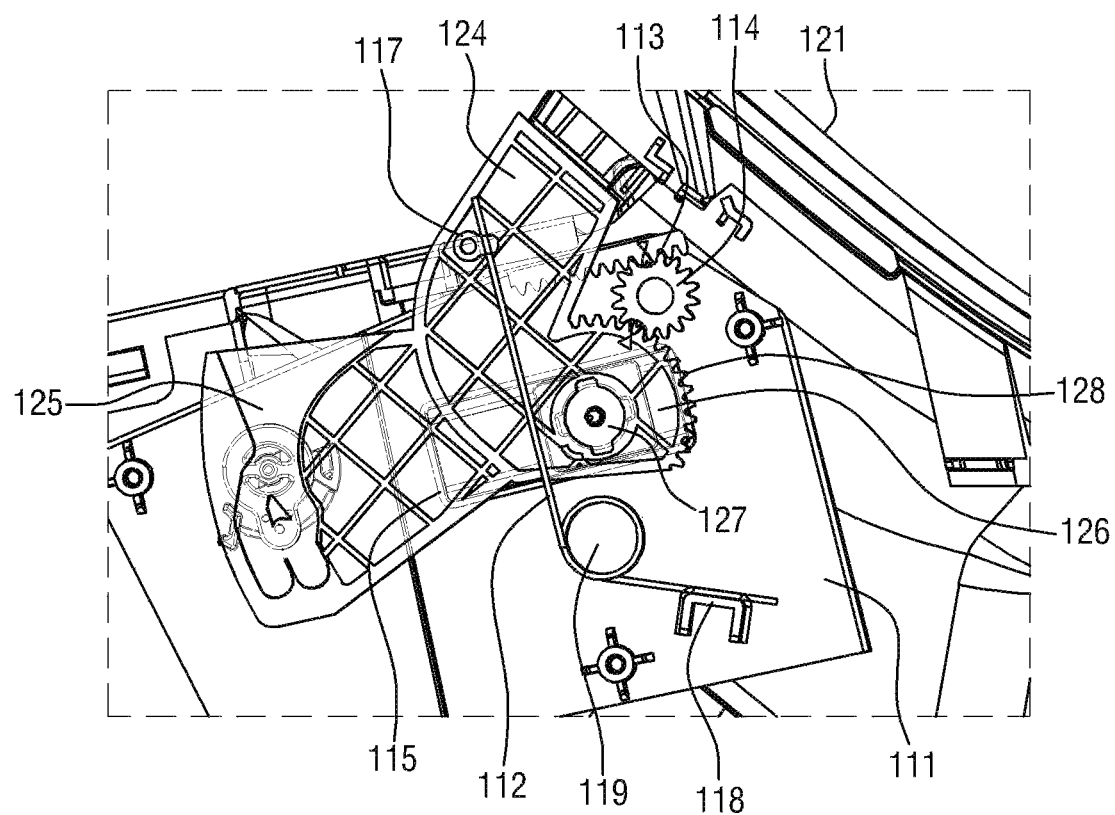
FIG. 4 is a detailed view illustrating part A in FIG. 3.
Figure 5:
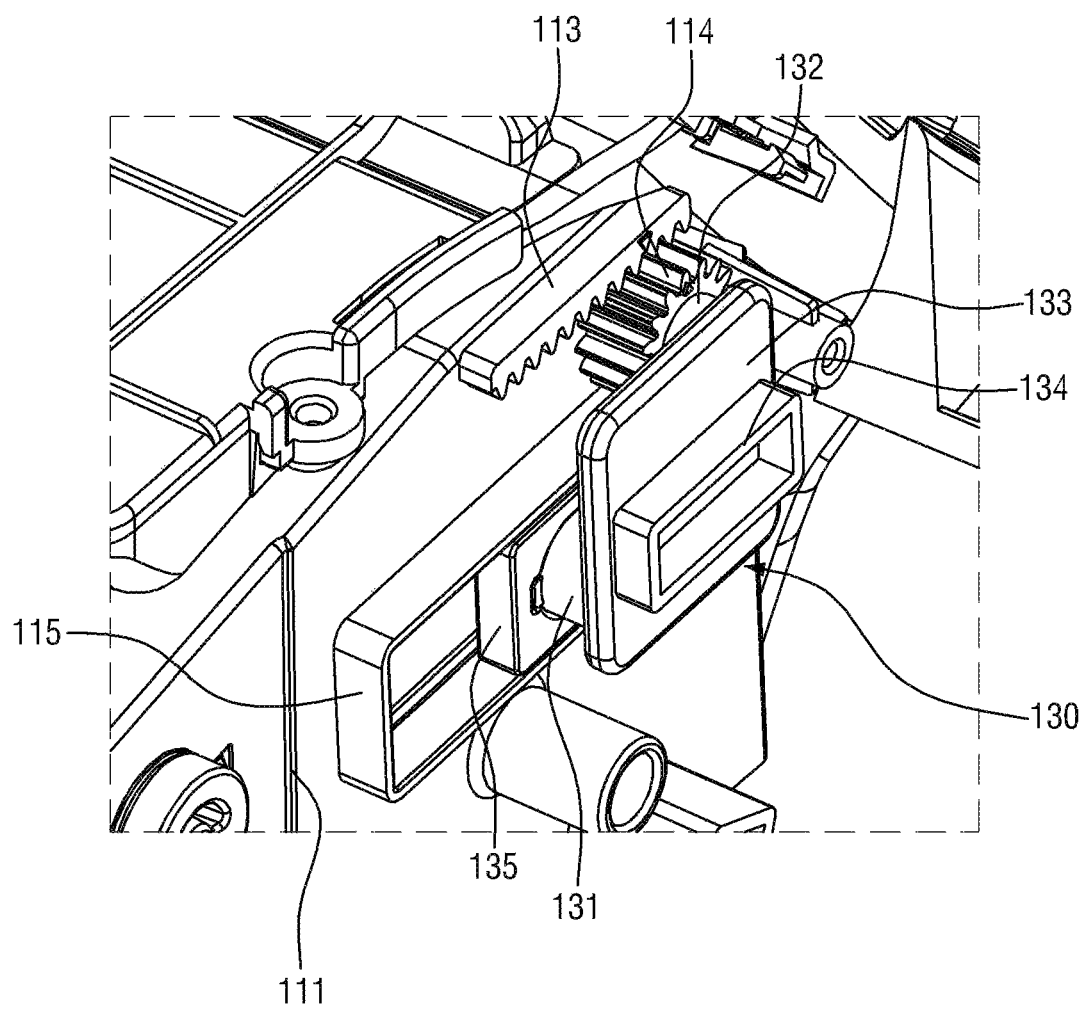
FIG. 5 is a perspective view illustrating part A in FIG. 3.

FIG. 2 is a perspective view illustrating a console tray for a vehicle according to an exemplary embodiment of the present disclosure, FIG. 3 is a cross-sectional view illustrating the console tray for a vehicle according to the exemplary embodiment of the present disclosure, FIG. 4 is a detailed view illustrating part A in FIG. 3, and FIG. 5 is a perspective view illustrating part A in FIG. 3.

Referring to FIGS. 2 and 3, a console tray 100 according to the exemplary embodiment of the present disclosure includes a housing 110 configured to define an internal space in the tray, and a cover unit 120 coupled to be rotatable upward from the housing 110 and configured to open or close an inlet 116 of the tray.

The cover unit 120 has a cover plate 121 having a flat plate shape, and a protruding rib 122 is attached to a lower portion of the cover plate 121, such that a user's finger is caught by the rib 122 when raising the cover plate 121 upward.

Referring to FIGS. 4 and 5, a side plate 111 is installed at one lateral side of the housing 110, and a spring 112 includes an insertion protrusion 119 formed at a lower portion of the side plate 111. One side of the spring 112 is caught by a lower catching part 118 formed at a lower side of the insertion protrusion 119, and the other side of the spring 112 is caught by an upper catching part 117 formed at an upper portion of an arm 123 of the cover unit 120.

A housing gear train 113 having a gear rack shape is attached to one side edge of an upper portion of the side plate 111, and a driving gear 114 is installed to mesh with the housing gear train 113. The driving gear 114 is axially coupled to a gear shaft 132 of a guide member 130 to be described below.

A guide slot 115 is provided in the side plate 111 and disposed at a lower side of the driving gear 114 in order to guide a movement of a slider 135 of the guide member 130 which will be described below. The guide slot 115 has a shape in which a quadrangular rim protrudes, and the slider 135 is inserted into the slot, such that the guide slot 115 guides the slider 135 when the slider 135 is moved in a left-right direction.

The arm 123, which extends over the side plate 111 attached to one surface of the housing 110, is provided on a rear surface of the cover plate 121 of the cover unit 120. Because a hinge shaft 131 of the guide member 130 is inserted into a passing hole 127 of the arm 123 so that the arm 123 is hingedly coupled, the arm 123 is rotated in a vertical direction about the hinge shaft 131 as the cover plate 121 is moved in the vertical direction.

The arm 123 includes an arm base 124 extending upward from the rear surface of the cover plate 121, an extending projection 125 extending in one direction from the arm base 124, a boss 126 extending in the other direction from the arm base 124, the passing hole 127 formed in the boss 126, and a cover gear 128 having a gear rack shape, formed on a part of a rim portion of the boss 126, and configured to mesh with the driving gear 114 coupled to the side plate 111.

Figure 6A:
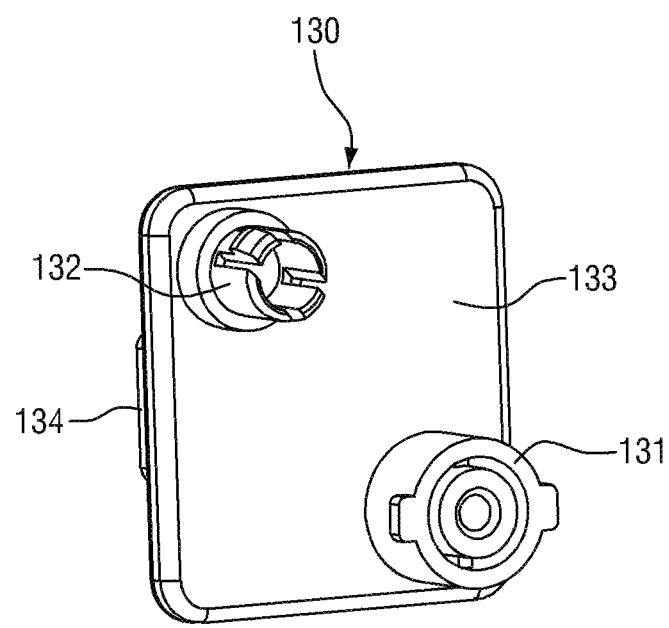
Figure 6B:
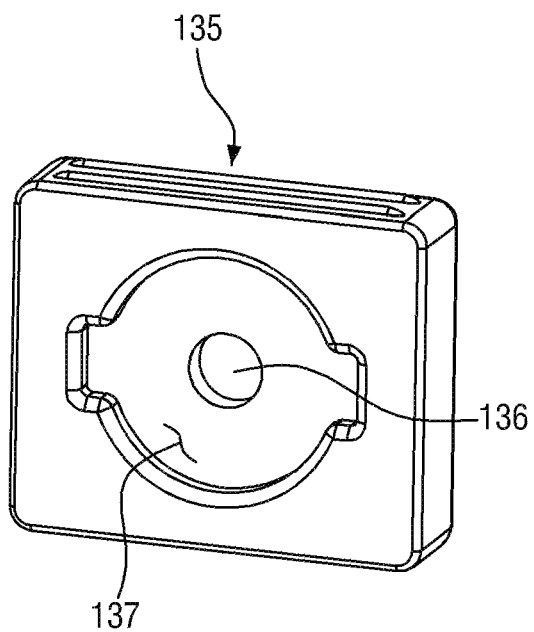

FIG. 6A is a perspective view illustrating the hinge guide, and FIG. 6B is a perspective view illustrating the slider.

As illustrated, the hinge guide 130 is a member configured to guide the arm 123 which is rotated as the cover plate 121 of the cover unit 120 is moved in the up-down direction. The hinge shaft 131 protrudes from a lower portion of one surface of a base 133 having a flat plate shape, the gear shaft 132 protrudes from an upper portion of one surface of the base 133, and a flange 134 having a protruding quadrangular rim is formed on the other surface of the base 133.

Particularly, in order to smoothly guide the operation of the hinge guide 130, the arm 123 may have a quadrangular long hole (not illustrated), and the flange 134 of the hinge guide 130 may be inserted into the long hole, such that the hinge guide 130 is moved in the horizontal direction.

The slider 135 has a recess 137 into which an end of the hinge shaft 131 of the hinge guide 130 exposed through the passing hole 127 of the arm 123 is inserted, and the recess 137 has a through hole 136 to which a screw (not illustrated) for fastening the slider 135 to the end of the hinge shaft 131 inserted into the recess 137 is coupled.

Hereinafter, an operation of the console tray according to the exemplary embodiment of the present disclosure configured as described above will be described.

Figure 7A:
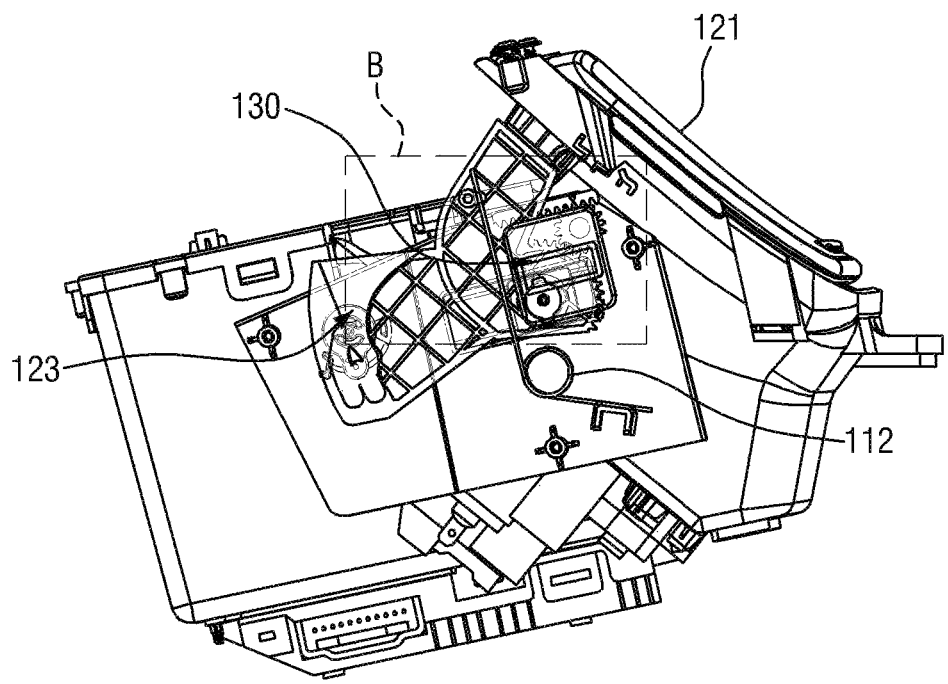
Figure 7A:
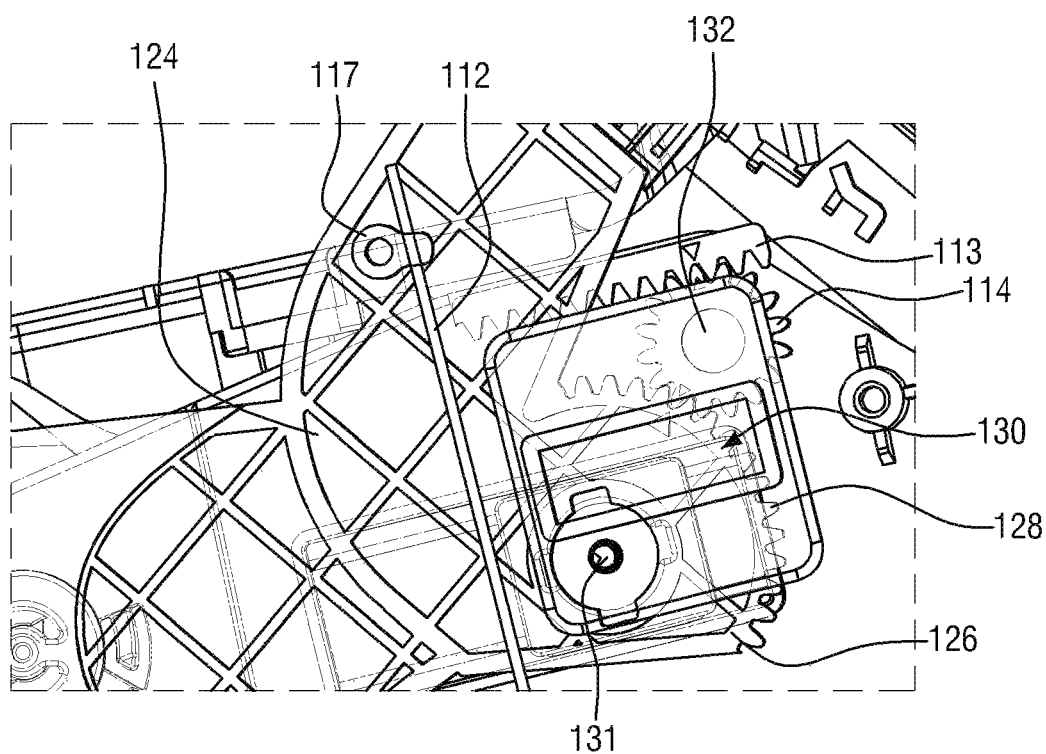
Figure 7B:
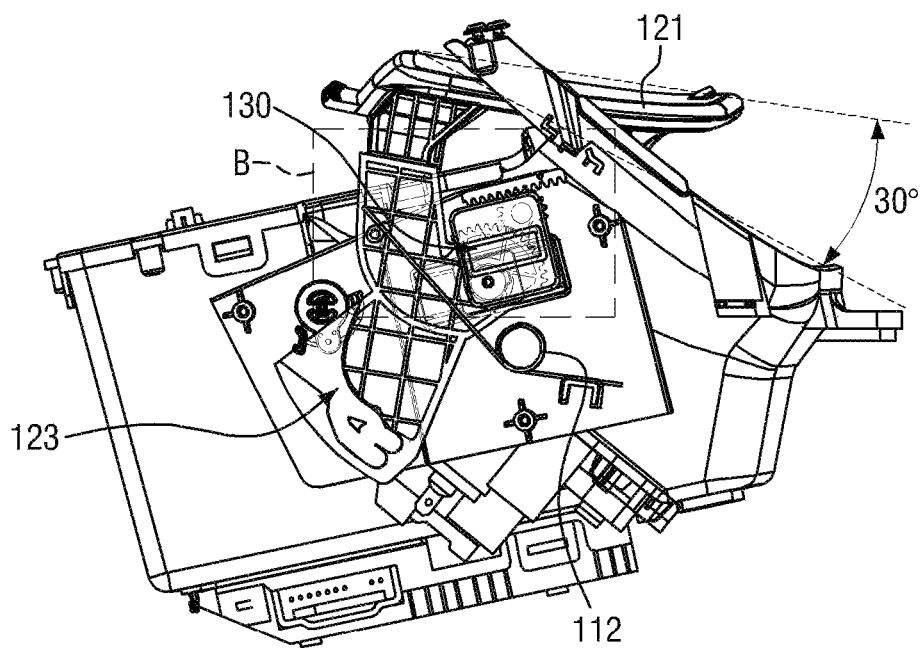
Figure 7B:
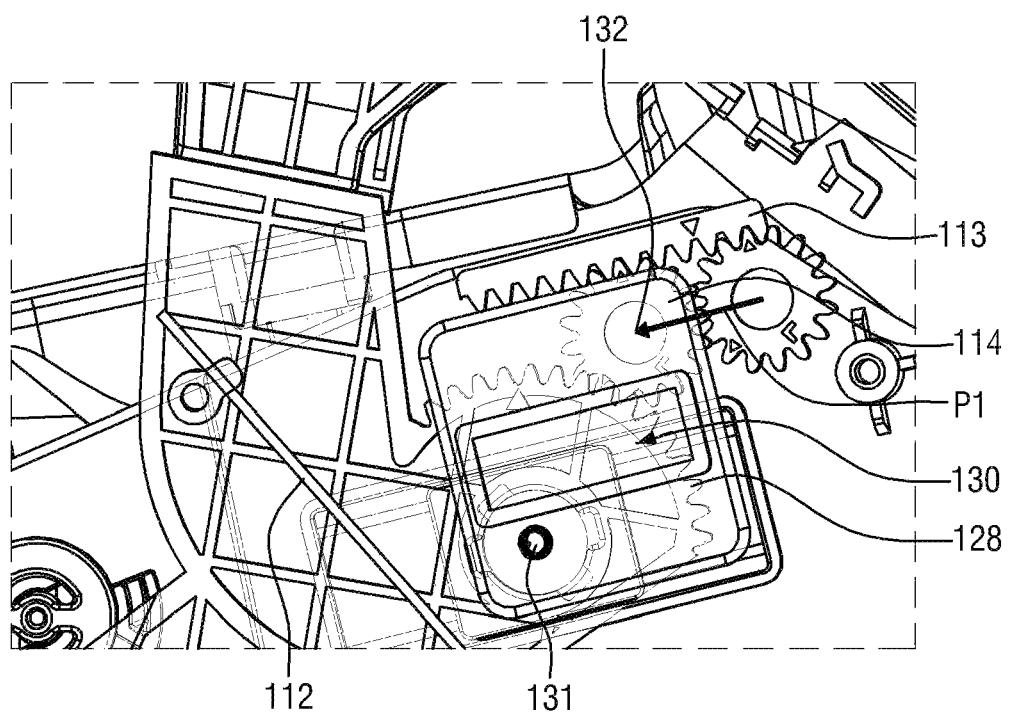
Figure 7C:
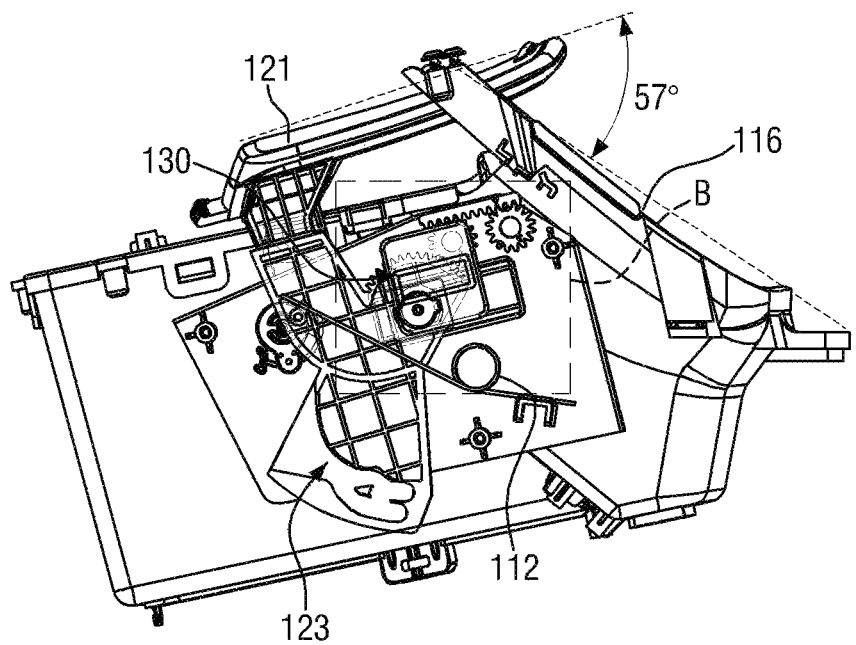
Figure 7C:
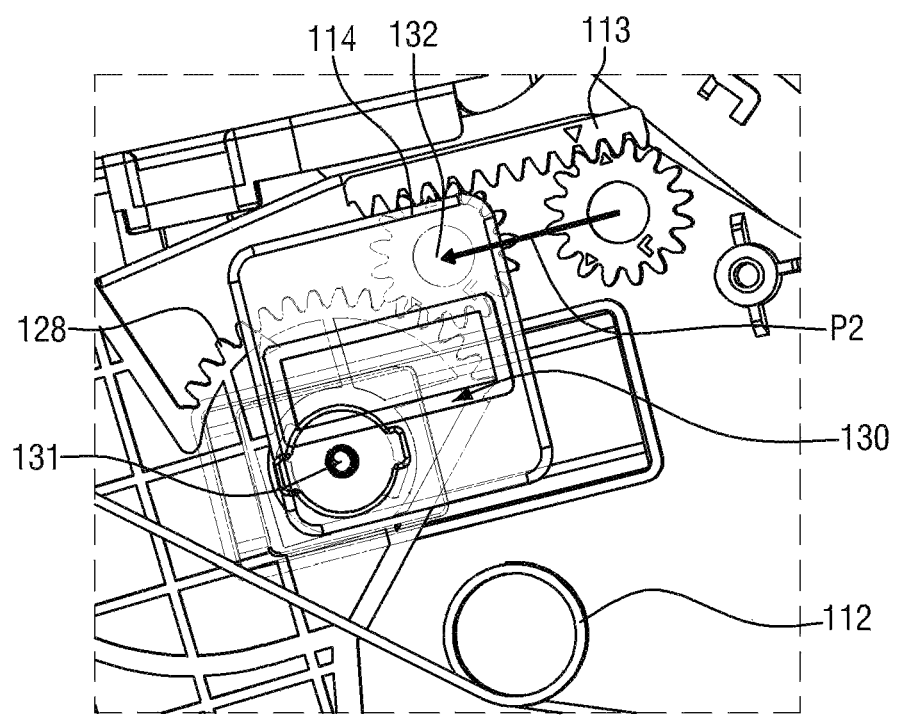

FIGS. 7A to 7C are views illustrating states in which the console tray for a vehicle according to the exemplary embodiment of the present disclosure operates, in which FIG. 7A is a view illustrating a state before the console tray operates, FIG. 7B is a view illustrating a state while the console tray operates, and FIG. 7C is a view illustrating a state after the console tray operates.

First, referring to FIG. 7A, the top part of FIG. 7A is a side view illustrating a state (before operation) before the console tray 100 according to the exemplary embodiment of the present disclosure opens the cover plate 121, and the bottom part of FIG. 7A is an enlarged view of part B. The cover plate 121 of the console tray 100 is closed, and the other end of the spring 112 coupled to the side plate 111 of the housing 110 is caught by the upper catching part 117, such that the cover plate 121 does not move upward. In this state, the driving gear 114 is positioned in place because the driving gear 114 meshing with the cover gear 128 of the arm 123 is not rotated. Therefore, the guide member 130 having the driving gear 114 installed at an upper end thereof is also not moved.

In this state, when the user raises the cover plate 121 of the console tray 100 upward, the state illustrated in FIG. 7B is made. FIG. 7B illustrates the state while the console tray operates in the state in which the cover plate 121 is raised upward at approximately 30 degrees. The top part of FIG. 7B is a side view illustrating a process (during operation) in which the console tray 100 according to the exemplary embodiment of the present disclosure opens the cover plate 121, and the bottom part of FIG. 7B is an enlarged view of part B.

In the state during operation, the arm 123 is rotated toward the inside of the housing 110 about the hinge shaft 131 in a state in which elastic force is applied to the spring 112 as the cover plate 121 is moved upward. Further, the slider 135 coupled to the end of the hinge shaft 131 illustrated in FIG. 5 is moved along the guide slot 115 toward the inside of the housing 110.

The driving gear 114 coupled to the gear shaft 132 of the guide member 130 is also moved along the housing gear train 113 and the cover gear 128 of the arm 123 by the movement of the guide slot 115, such that the driving gear 114 is moved toward the inside of the housing 110 by a first movement distance P1.

Next, when the user raises the cover plate 121 of the console tray 100 upward and completely opens the cover plate 121, the state illustrated in FIG. 7C is made.

The top part of FIG. 7C is a side view illustrating a state (after operation) in which the cover plate 121 of the console tray 100 according to the exemplary embodiment of the present disclosure is completely opened at approximately 57 degrees. The bottom part of FIG. 7C is an enlarged view of part B. The arm 123 is further rotated toward the inside of the housing 110 about the hinge shaft 131 in a state in which elastic force is applied to the spring 112 as the cover plate 121 is moved upward. Further, the slider 135 coupled to the end of the hinge shaft 131 is additionally moved along the guide slot 115 toward the inside of the housing 110. Further, the driving gear 114 coupled to the gear shaft 132 of the guide member 130 is also moved along the housing gear train 113 and the cover gear 128 of the arm 123 by the movement of the guide slot 115, such that the driving gear 114 is additionally moved toward the inside of the housing 110 by a second movement distance P2 from an initial position, and as a result, the cover plate 121 of the console tray 100 is completely opened.

Therefore, the cover plate 121 of the console tray 100 according to the exemplary embodiment of the present disclosure completely opens the tray by a rotation amount of approximately 57 degrees, and the small rotation amount allows the console tray 100 to occupy a small space that permits a rotation radius. Therefore, it is possible to solve the problem in the related art in that the cover of the console tray requires a space that may permit a rotation radius of approximately 88 degrees, which causes a decrease in capacity of the housing of the console tray. As a result, it is possible to increase the capacity of the tray and improve utilization of the tray.

Figure 8:
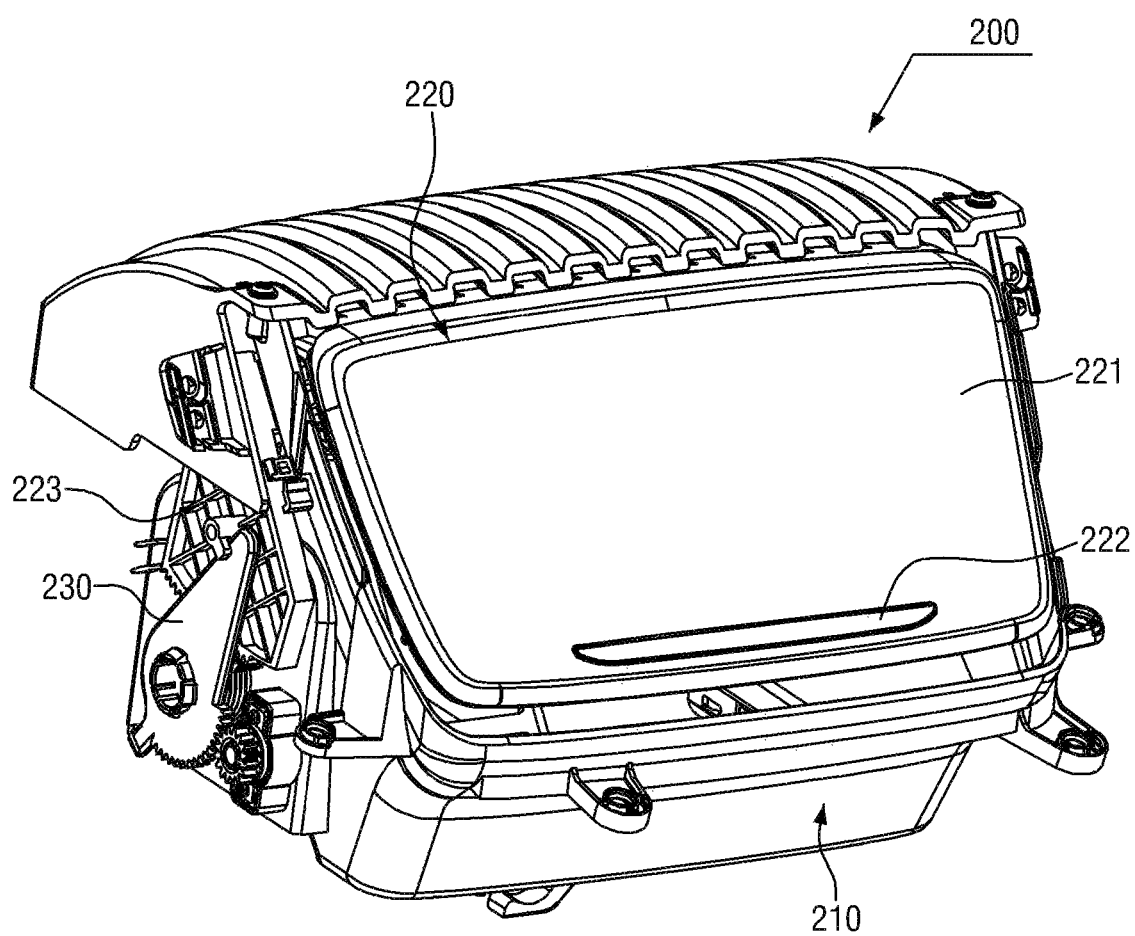
FIG. 8 is a perspective view illustrating a console tray for a vehicle according to another exemplary embodiment of the present disclosure.
Figure 9:
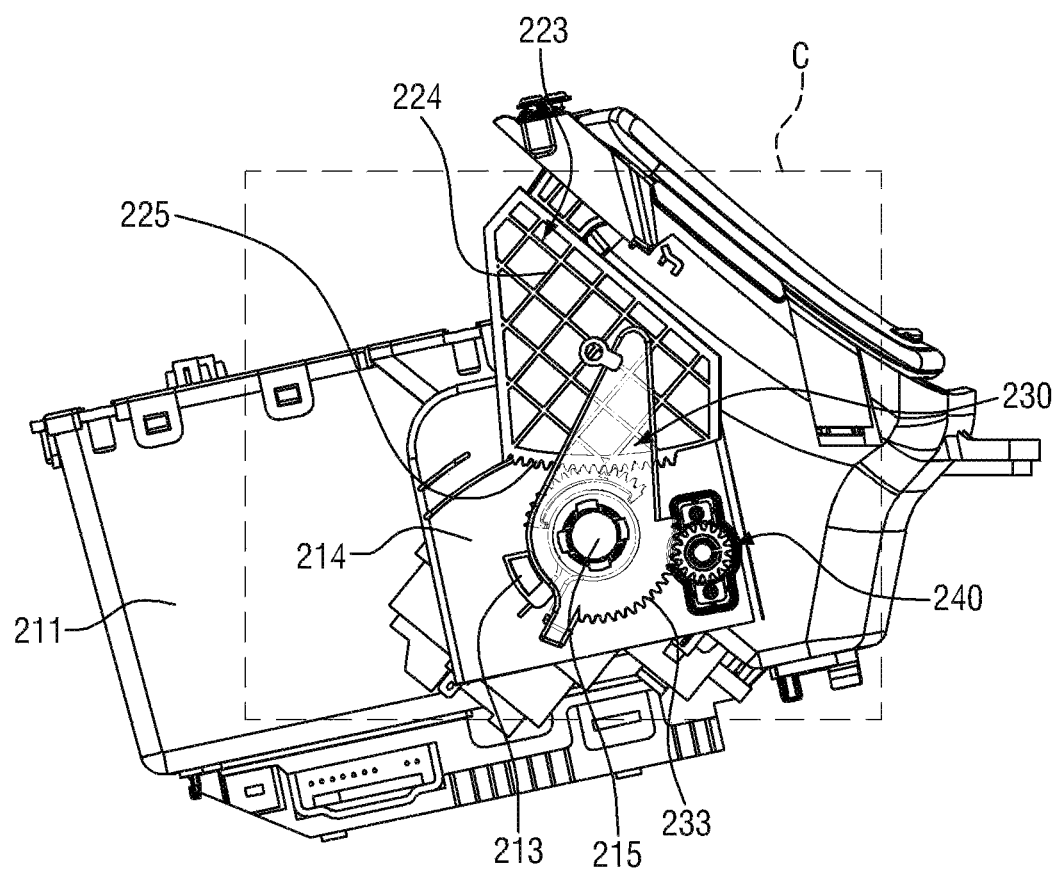
FIG. 9 is a cross-sectional view illustrating the console tray for a vehicle according to another exemplary embodiment of the present disclosure.
Figure 10:
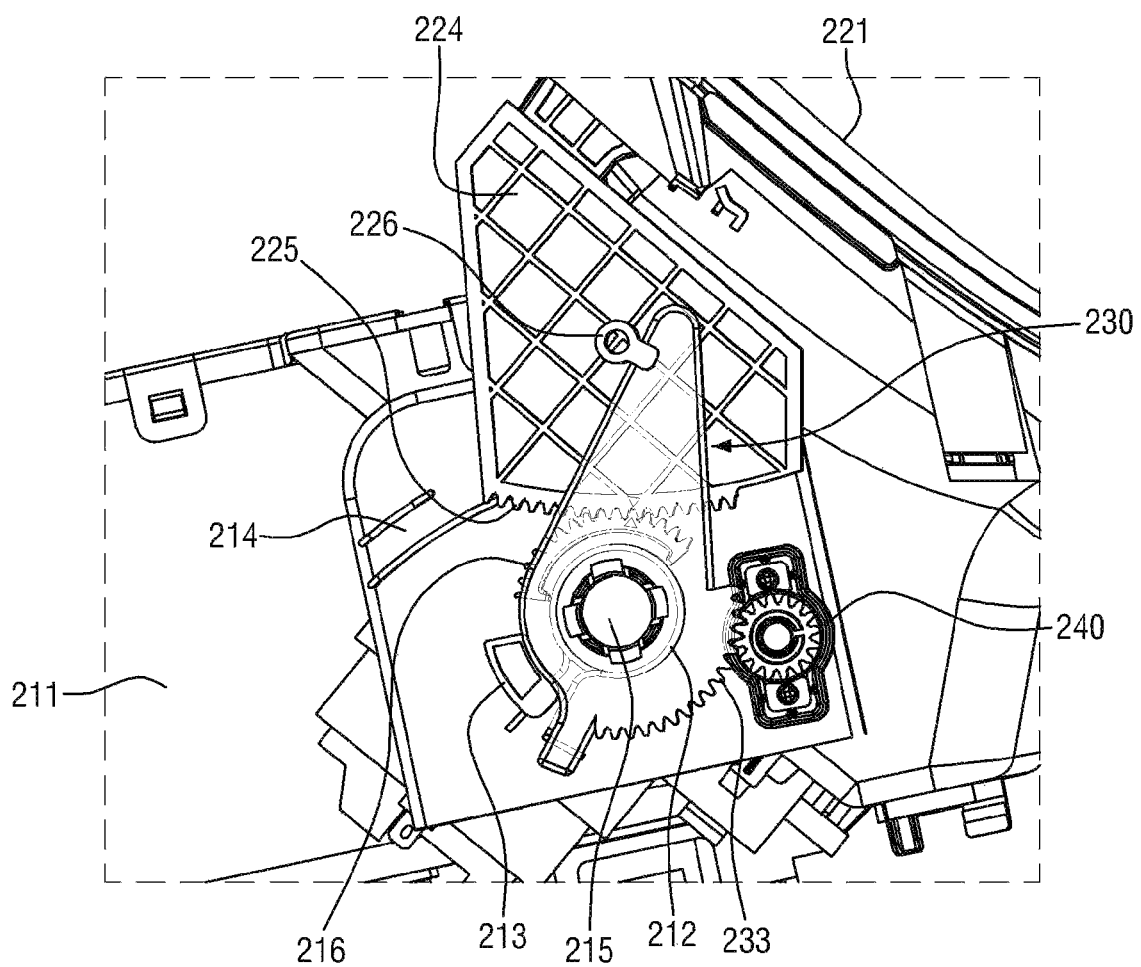
FIG. 10 is a detailed view illustrating part C in FIG. 9.
Figure 11A:
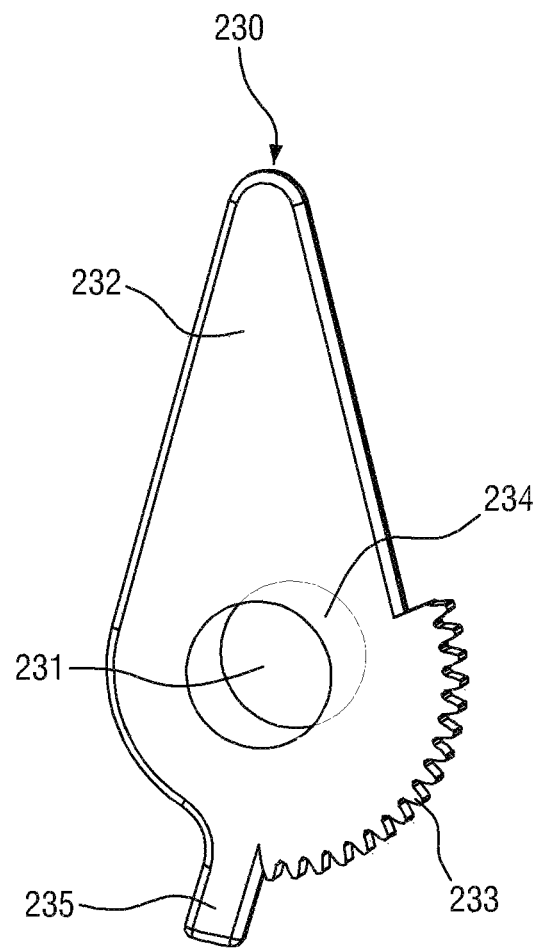
Figure 11B:
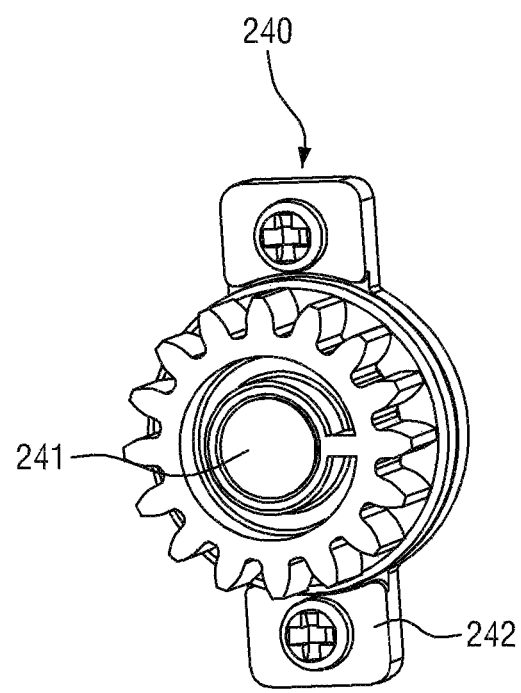
Figure 11C:
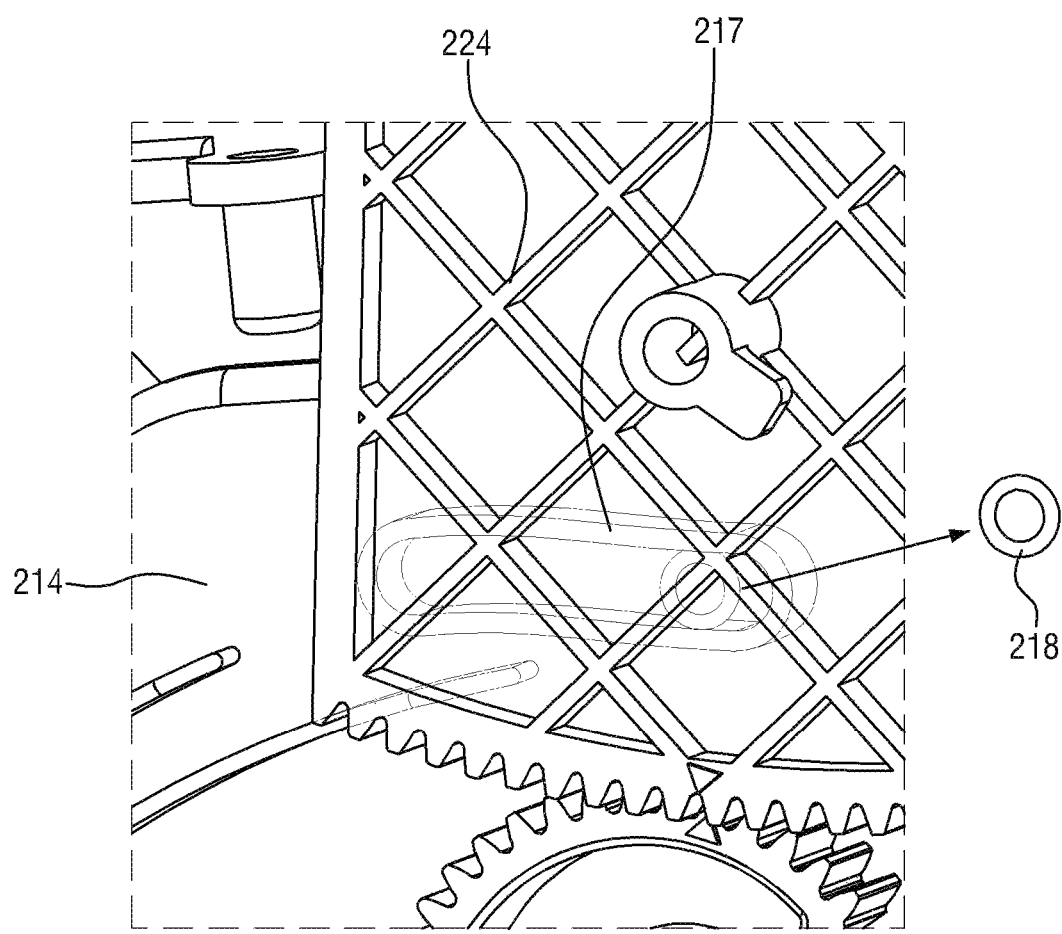

FIG. 8 is a perspective view illustrating a console tray for a vehicle according to another exemplary embodiment of the present disclosure, FIG. 9 is a cross-sectional view illustrating the console tray for a vehicle according to the exemplary embodiment of the present disclosure, FIG. 10 is a detailed view illustrating part C in FIG. 9, FIG. 11 is a detailed view illustrating components of the console tray for a vehicle according to another exemplary embodiment of the present disclosure, FIG. 11A is a perspective view illustrating a hinge guide, FIG. 11B is a perspective view illustrating a damper gear, and FIG. 11C is a perspective view illustrating a rim and an O-ring positioned on a bottom surface of an arm base.

Referring to FIGS. 8 and 9, a console tray 200 according to another exemplary embodiment of the present disclosure includes a housing 210 configured to define an internal space in the tray, and a cover unit 220 coupled to be rotatable upward from the housing 210 and configured to open or close an inlet of the tray.

The cover unit 220 has a cover plate 221 having a flat plate shape, and a protruding rib 222 is attached to a lower portion of the cover plate 221, such that a user's finger is caught by the rib 222 when raising the cover plate 221 upward.

Referring to FIG. 10, a base 214 is installed on the side plate 211 of the housing 210, and a through hole 231 of a hinge guide 230 is fitted with and coupled to an insertion protrusion 215 formed on the base 214. As illustrated in FIG. 11A, a ring-shaped spring 212 is fitted with a through hole extending projection 234 protruding from a rear surface of the hinge guide 230 along a circumference of the through hole 231 of the hinge guide 230. One side of the spring 212 is caught by a spring fixing part 213 formed on the base 214, and the other side of the spring 212 is caught by a latch 235 provided on a lower portion of the hinge guide 230.

An arm 223 extends upward from a rear surface of the cover plate 221 of the cover unit 220. The arm 223 includes an arm base 224 of the cover plate 221, a cover gear 225 formed on a part of a rim portion of the arm base 224 and configured to mesh with a housing gear train 216 formed on the base 214, and a guide fixing pin 226 formed on the arm base 224 and configured to be caught by an end of an extending plate 232 of the hinge guide 230. Since the guide fixing pin 226 is structured to be caught by the end of the hinge guide 230, the hinge guide 230 is rotated as the arm 223 is rotated.

A damper gear 240, which meshes with a guide gear train 233 of the hinge guide 230, is installed on the base 214. The damper gear 240 stably guides the rotation of the hinge guide 230.

Therefore, according to the tray according to another exemplary embodiment of the present disclosure configured as described above, when the cover plate 221 is moved upward, the arm 223 is rotated counterclockwise to rotate the hinge guide 230, and the detailed operation will be described below.

Referring to FIGS. 11A, 11B and 11C, the hinge guide 230 is a member having a flat plate shape, the through hole 231 into which the insertion protrusion 215 formed on the base 214 is inserted is formed in the lower portion of the hinge guide 230, and the upper portion of the hinge guide 230 has an extending plate 232 having a triangular shape of which the width is narrowed toward the end of the hinge guide 230. The guide gear train 233 having a gear rack shape is provided on a part of a rim of a peripheral body of the through hole 231 of the hinge guide 230. The through hole extending projection 234 protrudes from the rear surface along the circumference of the through hole 231. In addition, the latch 235, which is caught by the other side of the spring 212, is provided on the lower portion of the hinge guide 230.

The damper gear 240 includes a bracket 242 coupled to the base 214, and a gear body 241 rotatably coupled to the bracket 242.

Meanwhile, as illustrated in FIG. 11C, a slot-shaped rim 217, which protrudes in a quadrangular shape, is formed on the base 214 according to the present disclosure, an O-ring 218 is inserted into the rim 217, and the O-ring 218 serves to prevent a fluctuation of the arm 223 when the arm 223 is rotated.

Hereinafter, an operation of the console tray according to another exemplary embodiment of the present disclosure configured as described above will be described.

Figure 12A:
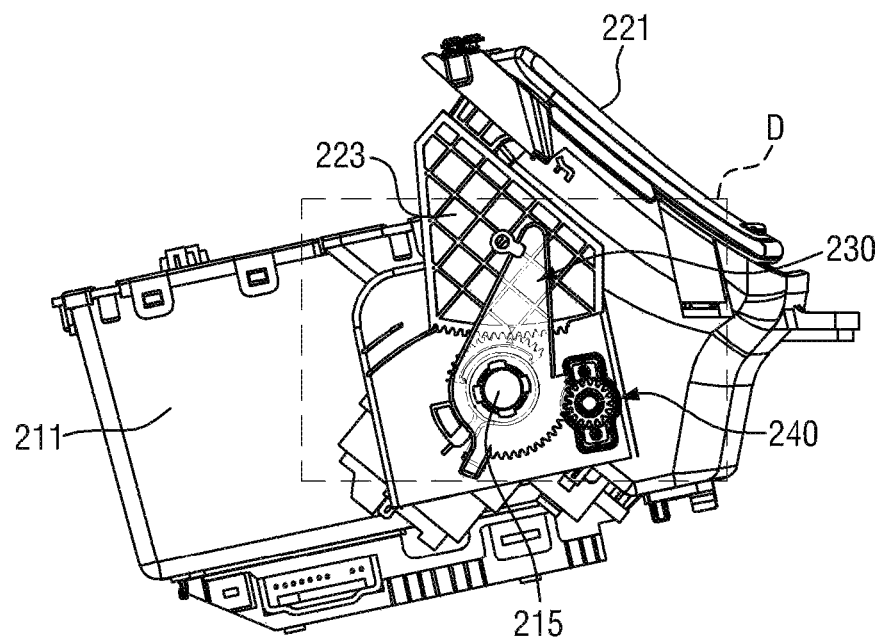
Figure 12A:
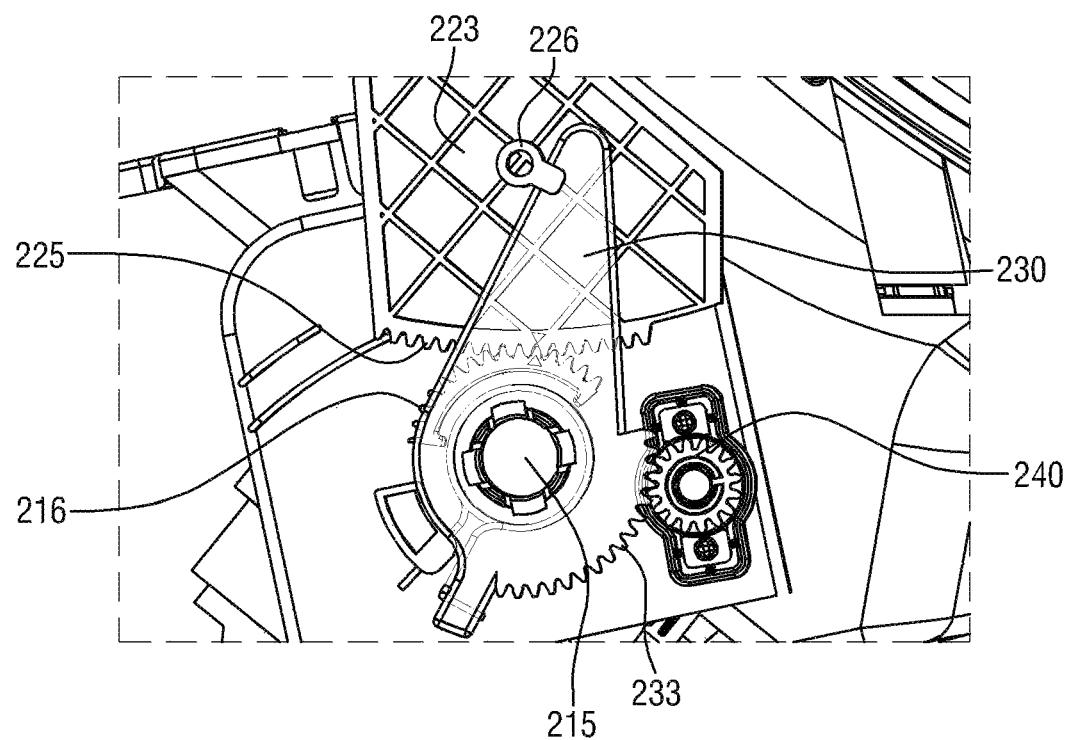
Figure 12B:
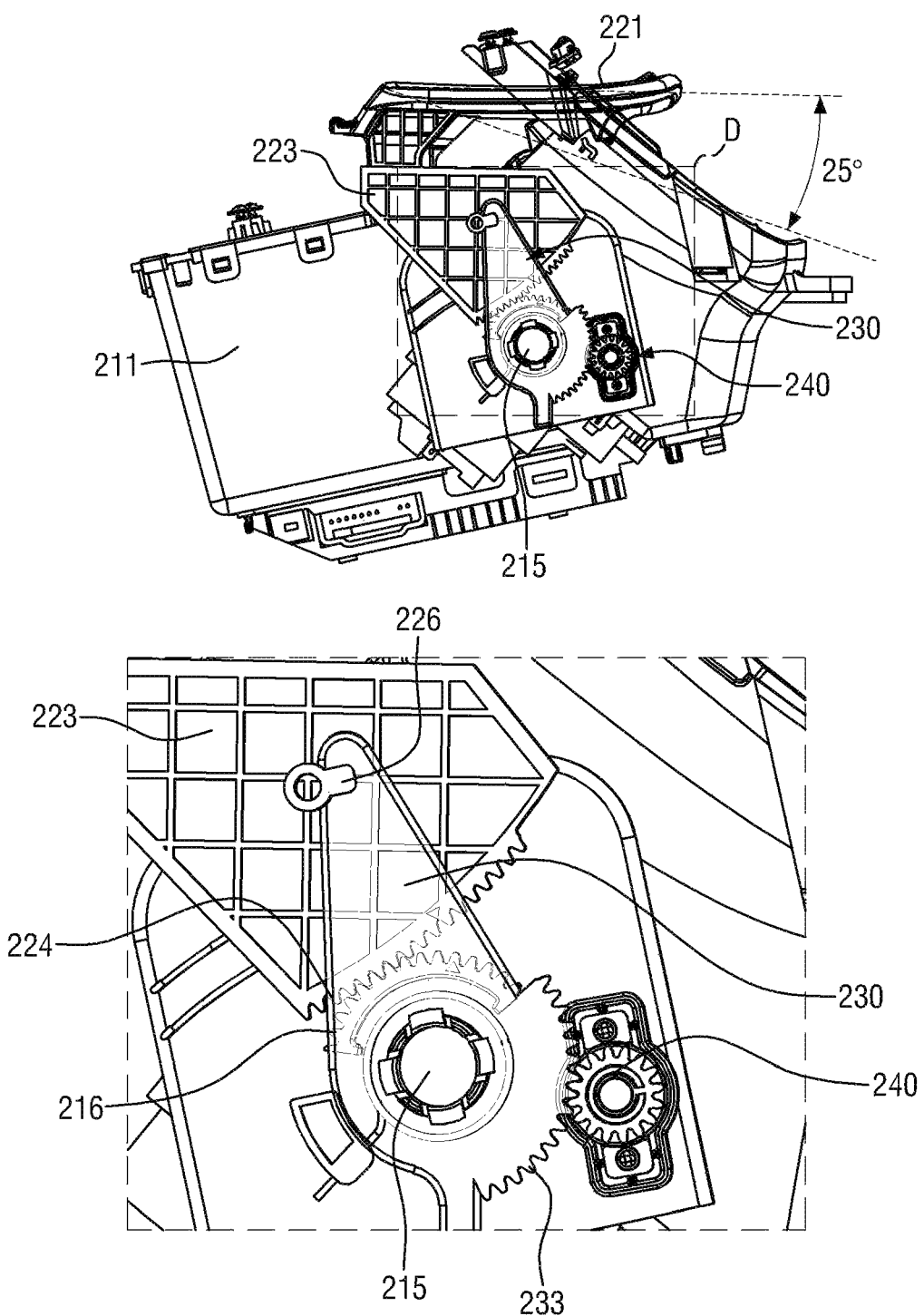
Figure 12C:
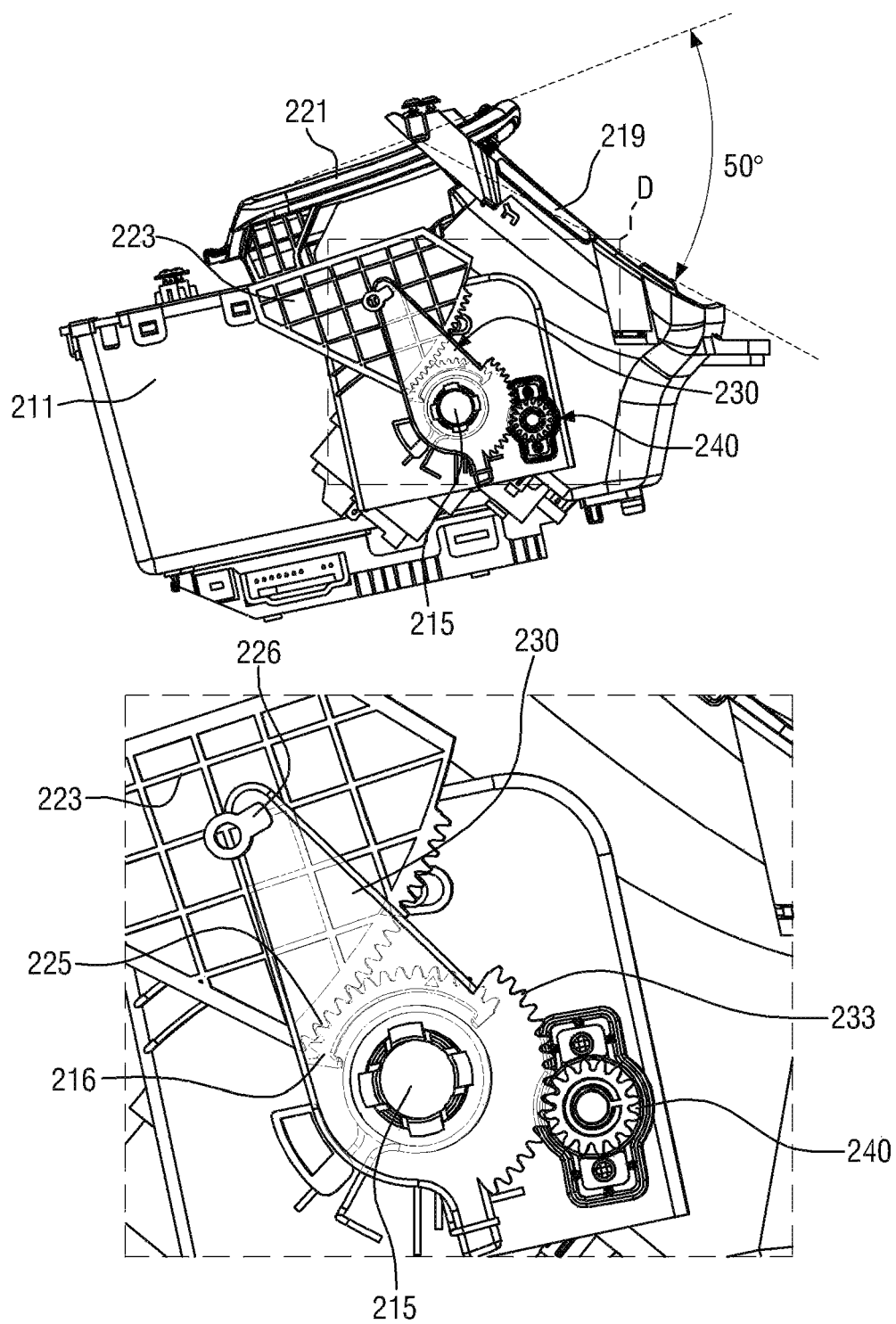

FIGS. 12A to 12C are views illustrating states in which the console tray for a vehicle according to another exemplary embodiment of the present disclosure operates, in which FIG. 12A is a view illustrating a state before the console tray operates, FIG. 12B is a view illustrating a state while the console tray operates, and FIG. 12C is a view illustrating a state after the console tray operates.

First, referring to FIG. 12A, the top part of FIG. 12A is a side view illustrating a state (before operation) before the console tray 200 according to another exemplary embodiment of the present disclosure opens the cover plate 221, and the bottom part of FIG. 12A is an enlarged view of part D. The arm 223 is not rotated when the cover plate 221 of the console tray 200 is closed, such that the hinge guide 230 caught by the guide fixing pin 226 of the arm 223 is not moved.

In this state, when the user raises the cover plate 221 of the console tray 200 upward, an in-operation state in which the cover plate 221 is raised upward at approximately 25 degrees is made, as illustrated in FIG. 12B. The top part of FIG. 12B is a side view illustrating a process (during operation) in which the console tray 200 according to another exemplary embodiment of the present disclosure opens the cover plate 221, and the bottom part of FIG. 12B is an enlarged view of part D.

In this in-operation state, as the cover plate 221 is moved upward, the cover gear 225 of the arm 223 meshes with the housing gear train 216, the arm 223 is rotated counterclockwise, and the cover plate 221 is retracted rearward toward the inside of the housing 210.

Then, the hinge guide 230 caught by the arm 223 by the guide fixing pin 226 is moved counterclockwise in accordance with the rotation of the arm 223. In this case, one side of the spring 212 fitted with the through hole extending projection 234 protruding from the rear surface of the hinge guide 230 is caught by the spring fixing part 213, and the other side of the spring 212 is caught by the latch 234 provided on the lower portion of the hinge guide 230, such that elastic force is applied to the hinge guide 230. Further, since the guide gear train 233 of the hinge guide 230 meshes with the damper gear 240, the hinge guide 230 is stably rotated by the damper gear 240.

Next, when the user raises the cover plate 221 of the console tray 200 upward and completely opens the cover plate 221, the state illustrated in FIG. 12C is made.

The top part of FIG. 12C is a side view illustrating a state (after operation) in which the cover plate 221 of the console tray 200 according to another exemplary embodiment of the present disclosure is completely opened at approximately 50 degrees, and the bottom part of FIG. 12C is an enlarged view of part D. The arm 223 is further rotated counterclockwise toward the inside of the housing 210 as the cover plate 221 is moved upward. The hinge guide 230 caught by the arm 223 by the guide fixing pin 226 is further rotated counterclockwise in accordance with the rotation of the arm 223, such that the cover plate 221 of the console tray 200 is completely opened.

Therefore, the cover plate 121 of the console tray 200 according to another exemplary embodiment of the present disclosure completely opens the tray by a rotation amount of approximately 50 degrees, and the small rotation amount allows the console tray 200 to occupy a small space that permits a rotation radius. Therefore, like the console tray 100 according to the above-mentioned exemplary embodiment, it is possible to solve the problem in that the capacity of the housing of the console tray is decreased. As a result, an effect of improving utilization of the tray by increasing the capacity of the tray may be obtained.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. A console tray for a vehicle, the console tray comprising:
   a housing having an internal space;
   a cover unit comprising:
      a cover plate coupled to be rotatable upward from the housing and configured to open or close an inlet of the tray; and
      an arm provided on a rear surface of the cover plate and configured to be rotated as the cover plate is moved in an up-down direction; and
   a guide member having a hinge shaft coupled to the arm;
   wherein the guide member moves the hinge shaft toward the inside of the internal space of the tray by a gear engagement structure between a lateral portion of the housing, the arm, and the guide member.

2. The console tray of claim 1, wherein a housing gear train is attached to a side plate of the housing, and a driving gear is installed to mesh with the housing gear train.

3. The console tray of claim 2, wherein the guide member has a gear shaft axially coupled to the driving gear, and the hinge shaft is inserted into a passing hole formed in the arm.

4. The console tray of claim 1, wherein a spring includes an insertion protrusion formed on a side plate of the housing, one side of the spring is caught by a lower catching part formed at a lower side of the insertion protrusion, and the other side of the spring is caught by an upper catching part formed on an upper portion of the arm of the cover unit.

5. The console tray of claim 2, wherein the arm comprises:
   an arm base extending upward from the rear surface of the cover plate;
   an extending projection extending in one direction from the arm base;
   a boss extending in the other direction from the arm base and having a passing hole; and
   a cover gear formed on a part of a rim portion of the boss and configured to mesh with the driving gear.

6. The console tray of claim 2, wherein a guide slot is provided in the side plate and disposed at a lower side of the driving gear, and a slider, which has a recess into which an end of the hinge shaft of the hinge guide is inserted is movably installed in the guide slot.

7. A console tray for a vehicle, the console tray comprising:
   a housing having an internal space;
   a cover unit comprising:
      a cover plate coupled to be rotatable upward from the housing and configured to open or close an inlet of the tray; and
      an arm extending from a rear surface of the cover plate; and
   a hinge guide coupled to an insertion protrusion formed on a base of the housing,
   wherein the hinge guide moves the arm toward an inside of the internal space of the tray by a gear engagement structure between the housing, the arm, and the hinge guide.

8. The console tray of claim 7, wherein the hinge guide has a through hole into which an insertion protrusion formed on the base is inserted, an upper portion of the hinge guide has an extending plate, and a guide gear train is provided on a part of a rim around the through hole.

9. The console tray of claim 7, wherein the housing has a housing gear train provided on the base installed on a side plate of the housing, and spring fixing parts by which a spring is caught are formed on the base.

10. The console tray of claim 9, wherein a through hole extending projection protrudes from a rear surface of a through hole of the hinge guide, the spring includes the through hole extending projection, one side of the spring is caught by the spring fixing part, and the other side of the spring is caught by a latch formed on a lower portion of the hinge guide.

11. The console tray of claim 7, wherein the arm comprises:
   an arm base;
   a cover gear provided on a part of a rim portion of the arm base and configured to mesh with a housing gear train; and
   a guide fixing pin provided on the arm base and configured to be caught by an end of an extending plate of the hinge guide, and
   wherein the guide fixing pin is caught by an end of the hinge guide and rotates the hinge guide in accordance with the rotation of the arm.

12. The console tray of claim 7, wherein a damper gear, which meshes with a guide gear train of the hinge guide, is installed on the base to stably guide the rotation of the hinge guide.

13. The console tray of claim 7, wherein a slot-shaped rim is formed on the base of the housing, and an O-ring is inserted into the rim.

\* \* \* \* \*